United States Patent [19]

Onishi et al.

[11] Patent Number: 5,016,049
[45] Date of Patent: May 14, 1991

[54] DOCUMENT DETECTING DEVICE FOR AN IMAGE FORMING APPARATUS

[75] Inventors: Takashi Onishi; Hiroyuki Hanamoto; Hirohisa Miyamoto; Keiji Yoshida, all of Osaka, Japan

[73] Assignee: Minolta Camera Kabushiki Kaisha, Osaka, Japan

[21] Appl. No.: 360,480

[22] Filed: Jun. 2, 1989

[30] Foreign Application Priority Data

Jun. 3, 1988 [JP] Japan .................................. 63-137687
Jun. 3, 1988 [JP] Japan .................................. 63-137688
Jun. 3, 1988 [JP] Japan .................................. 63-137689
Dec. 21, 1988 [JP] Japan .................................. 63-323994
Dec. 21, 1988 [JP] Japan .................................. 63-323995

[51] Int. Cl.$^5$ ...................... G03G 15/04; G03B 27/62
[52] U.S. Cl. ..................... 355/203; 355/311; 355/75
[58] Field of Search ................ 355/203, 204, 311, 75; 250/560

[56] References Cited

U.S. PATENT DOCUMENTS 4,456,372 6/1984 Yamauchi ............................. 355/75
4,692,019 9/1987 Morimoto et al. ................... 355/204

FOREIGN PATENT DOCUMENTS 56-78849 6/1981 Japan .
58-95367 6/1983 Japan .
60-260940 12/1984 Japan .

Primary Examiner—Joan H. Pendegrass
Attorney, Agent, or Firm—Burns, Doane, Swecker & Mathis

[57] ABSTRACT

A document detecting device for an image forming apparatus operates when a sensor supporting arm equipped with sensors is pivoted to a predetermined position below a document, the document size or the density of the image is detected by the combination of the detection results of the sensors. One of the combinations which is not used for the document size or density detection is used to detect that the sensor supporting arm is at its original position. This construction avoids such an error that the sensor supporting arm is misinterpreted as being at its original position when an irregular sized document is set.

When a new document is set, the data indicating the previous document size is accurately updated by the combined use of two switches. The first switch detects whether a document holding cover is opened less than a predetermined angle. The second switch detects whether the cover is completely closed. Thus, any potential errors which may occur when a new document is set by opening the cover less than the predetermined angle can be avoided.

21 Claims, 17 Drawing Sheets

DOCUMENT DETECTING DEVICE FOR AN IMAGE FORMING APPARATUS

BACKGROUND OF THE INVENTION (1) Field of the Invention

This invention relates to an image handling device, wherein an image of a document placed on a glass document table is optically read and is projected onto a device for electrically retaining the image, especially to a device for detecting such document conditions as size and density of the image. (Density means darkness of the color hereinafter.)

(2) Description of the Related Art

In order to read a document image in an image forming apparatus as an example of such an image handling device, the document size and the density of the image ought to be detected for the purpose of determining the scanning area and the quantity of light. The followings are some examples of conventional methods for detecting the document size.

(1) Pre-scanning is conducted by a CCD for reading a document image. This method has the problems that pre-scanning prolongs the whole copying operation and that the document size cannot be detected unless the rear surface of a document holding cover has a different color from that of the document.

(2) A special sensor for detecting the document size is provided below a glass document table. One construction of this method is as follows. A sensor supporting arm, comprising two rods connected to each other with a pin, is equipped with a plurality of sensors and is connected to a scanner at one end thereof. The document size is detected by pivoting the two rods. Practically, when the scanner stops at the scan completing position, the sensor supporting arm is pivoted into a V shape. The on/off state of each sensor indicates whether there is a document in its detecting spot or not, and the detection results of all the sensors are computed, whereby the document size is found. When the scanner starts scanning and reaches its destination, the sensor supporting arm is folded into two along one end of the glass document table in its longitudinal direction. Although this method does not require pre-scanning and so shortens the whole copying operation, it involves the following problems. The connecting section of the sensor supporting arm and the scanner is inevitably complicated and also have to be highly accurate. Therefore, a lot of parts are required, which increases the size of the device, the production cost, and difficulty in processing, assembling and operation. Further, the load of a motor for driving the scanner is increased.

SUMMARY OF THE INVENTION

Accordingly, this invention has an object of offering an image handling device which conducts the detection of the document size and the density of the image in a short period of time without pre-scanning.

Another object of this invention is to offer an image handling device which does the above detection accurately only by pivoting a rod.

Still another object of this invention is to offer an image handling device in which detecting means and a driving mechanism for pivoting the detecting means are simple and compact.

Still another object of this invention is to offer an image handling device which protects the detecting means and an optical system from being broken even if the latter bumps into the former when the former lingers in its detecting area by mistake after detection.

Still another object of this invention is to offer an image handling device which does the detection accurately even if a document has the same color with that of the rear surface of a document holding cover.

Still another object of this invention is to offer an image handling device which accurately acknowledges, between the detection and the duplication operation, that a document is replaced.

Still another object of this invention is to offer an image handling device which can be operated manually until a service personnel repairs it even if a trouble occurs.

The above objects are fulfilled by an image handling device comprising a glass document table on which a document is to be placed; projecting means for optically scanning the document on the document table from below and for projecting a light corresponding to an image of the document onto a device for electrically retaining the image; at least one sensor for detecting document condition; sensor supporting means, for supporting the sensor, which is pivotal between a predetermined position below the glass document table and its original position outside the area right below the glass document table; and pivoting means for pivoting the sensor supporting means.

The device for electrically retaining the image may be a photoconductive drum.

The sensor may detect whether there is a document in its detecting spot or not.

The sensor may detect the density of the document image in its detecting spot.

The sensor may comprise a light emitting and a light receiving elements.

The light emitting device may emit light obliquely upward, and the light receiving element may have its light receiving surface directed right above in order to detect irregularly reflected light.

The sensor supporting means may be a long straight rod having its only pivoting center near one end thereof.

The pivoting center may be on the same side with the scan starting position of the projecting means, in view of the scanning direction.

The pivoting center may be on the same side with a side of the glass document table along which the document is aligned, in the view of the scanning direction.

The sensor supporting means may be always energized toward its original position and may be pivoted to the predetermined position by the pivoting means against the energizing force.

According to the above construction, when the sensor supporting means is pivoted to the predetermined position below the glass document table, the sensor for detecting document condition is turned on or off in accordance with whether there is a document in its detecting spot or not, whereby the document size is detected. Therefore, there is no need of pre-scanning, and so the whole copying operation is done in a short period of time.

The above objects are also fulfilled by an image handling device comprising a glass document table on which a document is to be placed; a document holding cover pivotally provided so that it may be closed to cover the glass document table and opened; projecting means for optically scanning the document on the document table from below and for projecting a light corresponding to an image of the document onto a device for electrically retaining the image; at least one sensor for detecting document condition; sensor supporting means, for supporting the sensor, which is pivotal between a predetermined position below the glass document table and its original position outside the area right below the glass document table; pivoting means for pivoting the sensor supporting means; and control means for retracting the sensor supporting means back to its original position when the document holding cover is closed and for pivoting the sensor supporting means to the predetermined position when the document holding cover is opened.

According to this construction, the document holding cover is opened when the detection is executed. Therefore, even if the rear surface of the document holding cover has the same color with that of a document, the sensor does not misinterpret the rear surface as the document, resulting in the accurate detection.

The above objects are also fulfilled by an image handling device comprising a glass document table on which a document is to be placed; a document holding cover pivotally provided so that it may be closed to cover the glass document table and opened; angle detecting means for detecting whether the document holding cover is opened less than the predetermined angle or not; projecting means for optically scanning the document on the document table from below and for projecting a light corresponding to an image of the document onto a device for electrically retaining the image; at least one sensor for detecting document condition; sensor supporting means, for supporting the sensor, which is pivotal between a predetermined position below the glass document table and its original position outside the area right below the glass document table; pivoting means for pivoting the sensor supporting means; computing means for driving the pivoting means to pivot the sensor supporting means up to the predetermined position and for detecting the size of the document using an output from the sensor; and commanding means for commanding the computing means to detect the document size when the angle detecting means detects that the document holding cover is opened not less than the predetermined angle.

The predetermined angle may be 30°.

The image handling device may further comprise storing means for storing a document size data obtained by the computing means; detecting means for detecting whether the document holding cover is opened or closed; and resetting means for resetting the document size data stored in the storing means in accordance with the detection result of the detecting means.

According to this construction, whether a document is replaced or not is detected by the combination of the opened/closed state and the opening angle of the document holding cover. Therefore, duplication is not done with wrong data.

The above objects are also fulfilled by an image handling device comprising a glass document table on which a document is to be placed; projecting means for optically scanning the document on the document table from below and for projecting a light corresponding to an image of the document onto a device for electrically retaining the image; a plurality of sensors for detecting document condition; sensor supporting means, for supporting the sensors, which is pivotal between a predetermined position below the glass document table and its original position outside the area right below the glass document table; pivoting means for pivoting the sensor supporting means; computing means for driving the pivoting means to pivot the sensor supporting means up to the predetermined position and for detecting the size of the document using the combination of outputs from the sensors; and judging means for selecting one out of combinations of outputs from the sensors, the above combinations not being used for document size detection, and for judging whether the sensor supporting means is at its original position or not using the above-selected combination.

The image handling device may further comprising a member, provided above the original position of the sensor supporting means, for changing the detection result of at least one of the sensors so that the combination of outputs selected by the judging means may be obtained.

The computing means may also detect whether the sensor supporting means has been pivoted or not using the change with the passage of time in the combination of outputs from the sensors.

According to this construction, the sensor supporting means is accurately detected to be at its original position, whereby the driving condition of the sensor supporting means is supervised. Therefore, additional means for checking the driving condition of the sensor supporting means is not necessary, realizing a compact image handling device.

The above objects are also fulfilled by an image handling device comprising a glass document table on which a document is to be placed; projecting means for optically scanning the document on the document table from below and for projecting a light corresponding to an image of the document onto a device for electrically retaining the image; at least one sensor for detecting document condition; sensor supporting means, for supporting the sensor, which is pivotal between a predetermined position below the glass document table and its original position outside the area right below the glass document table; pivoting means for pivoting the sensor supporting means; automatic mode setting means for pivoting the sensor supporting means up to the predetermined position to set the automatic mode, in which the size of the document is automatically detected by the sensor; manual mode setting means for setting manual mode, in which the size of the document is manually selected; and mode switching means for changing the automatic mode into the manual mode when the sensor supporting means is detected not to have been pivoted to the predetermined position.

The mode switching means may be operated only when, despite that both the automatic and the ADF modes are selected, the sensor supporting means is detected not to have been pivoted.

The image handling device may further comprise displaying means for displaying that the supporting means is detected not to have been pivoted According to this construction, the automatic mode is switched into the manual mode if a trouble occurs. Therefore, the manual mode operation is secured until a service personnel solves the trouble.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Overall construction and operation of the copier

Figure 1:
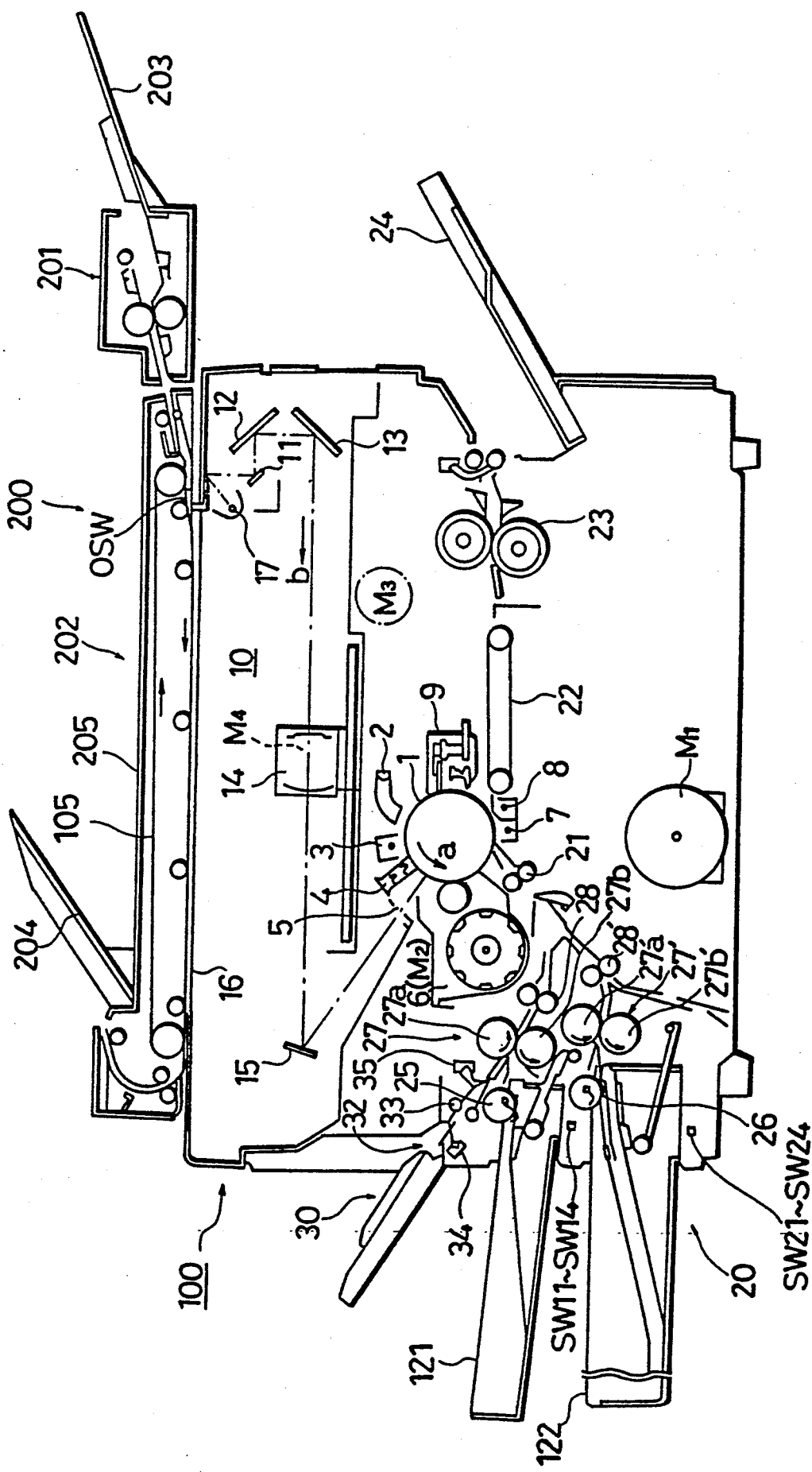
FIG. 1 shows the internal construction of a copier 100 to this invention.

FIG. 1 shows the internal construction of a copier 100 according to this invention. A photoconductive drum 1 is retained rotatably in the direction of an arrow a at the substantial center of the copier 100. The photoconductive drum 1 is surrounded by an eraser lamp 2, a main charger 3, an eraser 4 for document margins and blank portions, a developing device 6, a transfer charger 7, a separation charger 8 and a cleaner 9 in this order in the direction of the arrow a. When the photoconductive drum 1 has passed under the eraser lamp 2 and the main charger 3, the photoconductive layer thereon is uniformly charged. Then, the above layer is exposed to the light, which has travelled through an optical system 10, through a slit 5, whereby an electrostatic latent image is formed on the surface of the above layer. When the electrostatic latent image is formed, the eraser 4, which has multiple LEDs arranged perpendicularly to the rotating direction, removes unnecessary charges.

The optical system 10 is provided below a glass document table 16 so that it may scan a document. The optical system 10 comprises an exposure lamp 17, movable mirrors 11, 12 and 13, a lens 14 and another mirror 15. The exposure lamp 17 and the movable mirror 11 are driven by a scanning motor M3 to integrally move in the direction of an arrow b at the speed of v/m (v: the circumferential speed of the photoconductive drum 1, fixed irrespective of the magnification ratio; m: magnification ratio). The movable mirrors 12 and 13 are also driven by the scanning motor M3 to integrally move in the direction of the arrow b at the speed of v/2 m. The magnification ratio is changed by the following theoretically known method. The lens 14 is moved on the optical axis by a stepping motor M4, and at the same time the mirror 15 is moved and swung in order to compensate the optical path. The scanning speed of the optical system 10 is adjusted by changing the rotating speed of the scanning motor M3 in accordance with the signal indicating the magnification ratio. The practical description of the adjustment method will be omitted.

The copier 100 has automatic feeding means 20 comprising an upper and a lower cassette loading openings on the left side thereof in FIG. 1, and also has manual feeding means 30 above the automatic feeding means 20. A copying paper is fed into the copier 100 by either one of the above means 20 or 30. After paused and synchronized with the image formed on the photoconductive drum 1 by a pair of timing rollers 21, the copying paper is sent to a transfer section. Then, it has a toner image transferred thereon by the transfer charger 7, is separated from the photoconductive drum 1 by the separation charger 8, is sent by a transport belt 22 to a fixing section 23 where it has the toner image fixed thereon, and is delivered to a delivery tray 24. After transference, the residual toner and electric charge on the surface of the photoconductive drum 1 are removed so that the photoconductive drum 1 is prepared for the next round of duplication.

In more detail, when the automatic feeding means 20 is selected, the copier 100 operates as follows. A print key 82 (FIG. 10) is pushed for starting a copying operation of the copier 100, whereby predriving including the rotation of the photoconductive drum 1 starts. When it is finished, one of feeding rollers 25 and 26 is driven. Then, a scan starting signal is output, accompanied by the transport of the copying paper, whereby the optical system 10 is driven. In consequence, the copying paper is fed in synchronization with the image forming operation. Even if two or more sheets of copying paper are pushed in by the feeding roller 25 or 26, selveging means 27 or 27' feeds only the uppermost sheet.

The selveging means 27 or 27' comprises an upper or 27a or 27a' and a lower roller 27b or 27b'. The upper rollers 27a and 27a' are driven to rotate as shown with the arrows in order to feed the copying paper into the copier 100, and the lower rollers 27b and 27b' in order to feed the copying paper back. After multiple sheets of copying paper are pushed in by the feeding roller 25 or 26, only the uppermost one is fed toward a pair of intermediate rollers 28 or 28' and those except the uppermost one are fed back by the lower roller 27b or 27b'. The intermediate rollers 28 or 28' are driven in association with the timing rollers 21.

When the manual feeding means 30 is selected, the operation is as follows. When a sensor 34 detects that the copying paper is inserted through a slit 32, another feeding roller 33 is rotated in order to push the copying paper in. At the same time or a little later, the photoconductive drum 1 and the other means start operating in the same way with the above. The copying paper is paused at a detection section of a paper leading end detecting switch 35. After the predriving operation including the rotation of the photoconductive drum 1 is finished, the feeding roller 33 is rotated again, whereby the copying paper is fed into the copier 100.

The cassette loading sections of the automatic feeding means 20 respectively has paper size detecting switches SW11 through SW14 and SW21 through SW24. Cassettes 121 and 122 have projecting portions or magnets (not shown). The above switches are operated in accordance with the way the projecting portions or magnets are arranged, whereby the size of the paper are detected and output as a 4-bit binary code.

An automatic document feeder ADF 200, which is loaded on the copier 100, will be described hereinafter. The ADF 200 substantially comprises a document feeding section 201 for storing multiple documents and sending them off one by one, and a document transport section 202 for transporting a document on the glass document table 16 by a transport belt 105, stopping the document at a predetermined position on the glass document table 16, and delivering the document onto a tray 204 after scanning. The document transport section 202 can also be used independently for manual feeding. The document transport section 202 has a document holding cover 205. Manual copying can be done by opening the cover 205 a predetermined angle and placing a document on the glass document table 16. Whether the cover 205 is opened or closed is detected by a switch KSW, which is schematically shown in FIG. 2.

Document size detecting sensors

Figure 2:
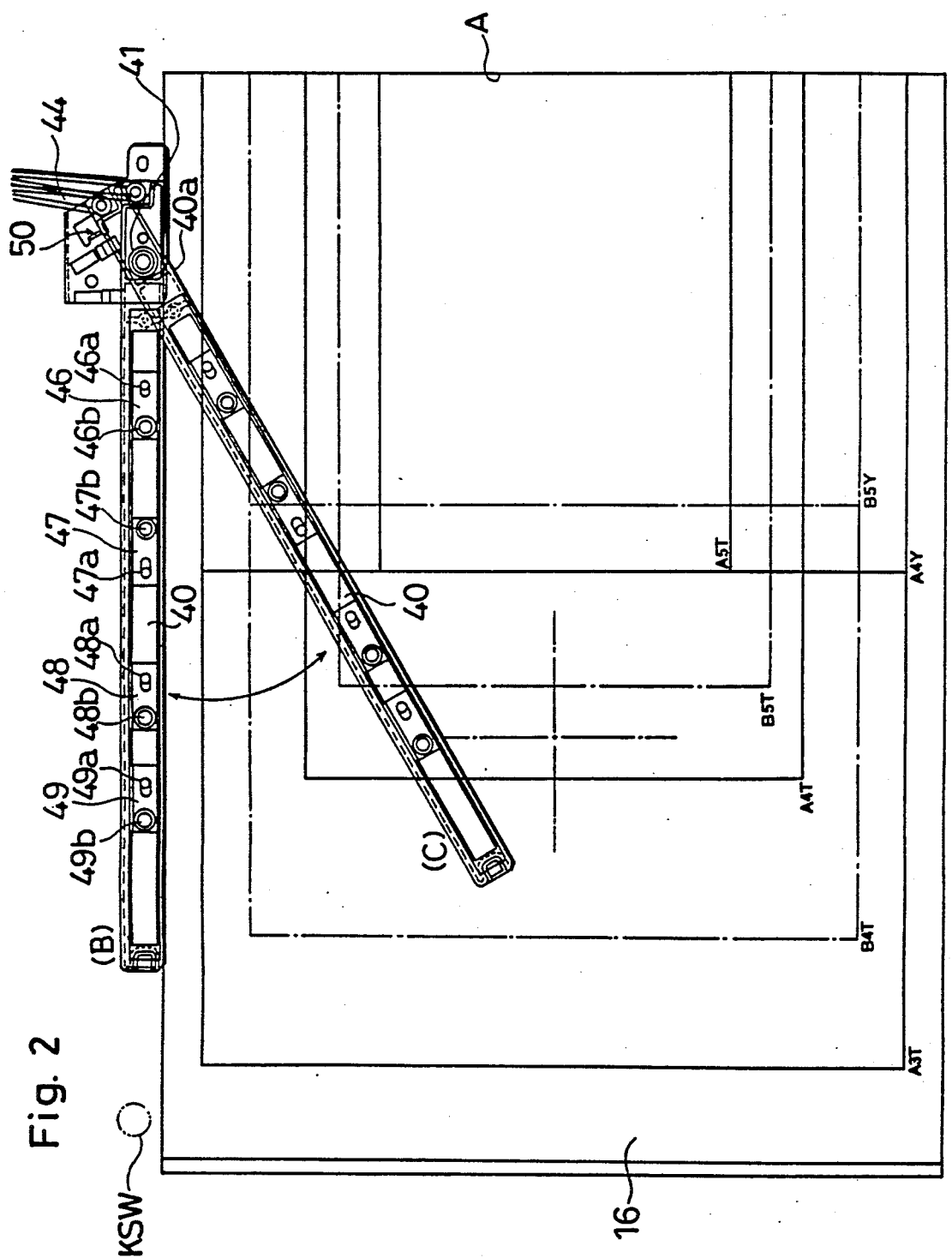
FIG. 2 shows a sensor supporting arm seen from the above.

FIG. 2 shows a sensor supporting arm 40, which is equipped with document condition detecting sensors 46 through 49. It is provided on substantially the same plane with the one on which the exposure lamp 17 (the closest member to the glass document table 16 in the optical system 10) is moved. Seen from the above, it is beside the glass document table 16 as in this figure. The sensor supporting arm 40 is pivotal between its original position B and a predetermined position C, below the glass document table 16, where the above sensors detect the document size. A pivoting center 40a of the sensor supporting arm 40 is provided near the side A of the glass document table 16 along which a document is aligned. As shown in FIG. 4, the sensor supporting arm 40 is retained on an outer frame 101, and its pivoting is driven by a solenoid 42 (FIG. 3).

Figure 3:
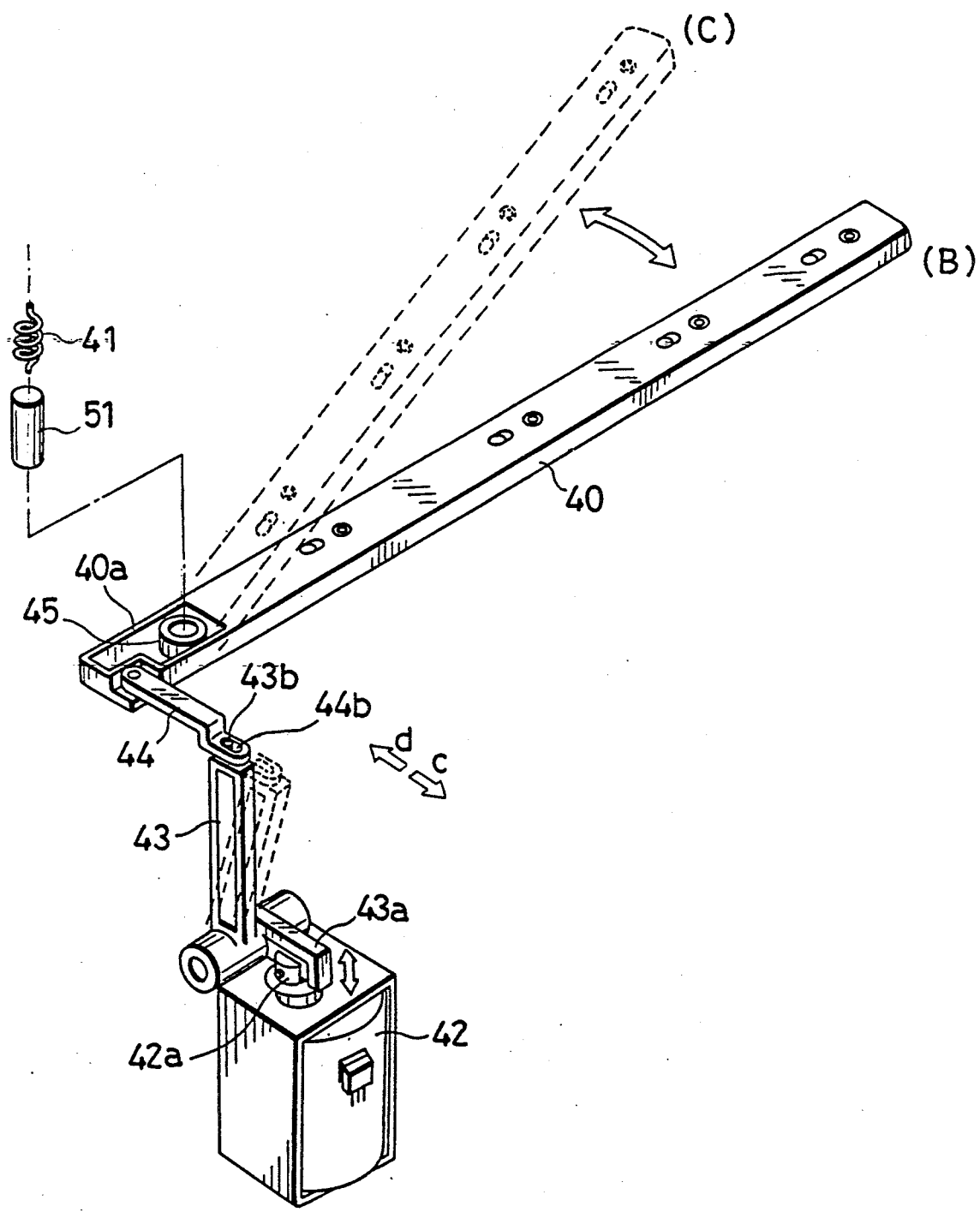
FIG. 3 is a perspective view of the above sensor supporting arm.
Figure 4:
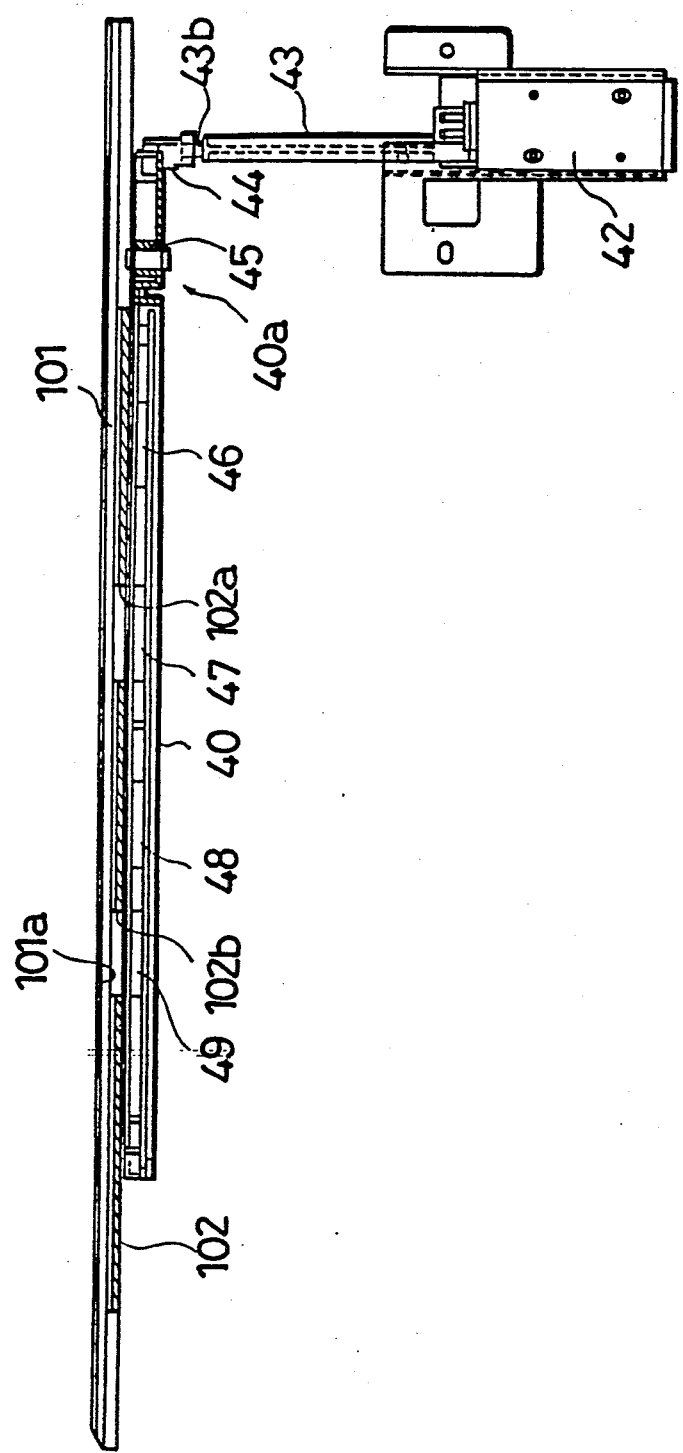
FIG. 4 is a side view of the same.

Its pivoting mechanism is illustrated in FIG. 3. The pivoting center 40a has a bearing 45. A supporting pin 51, around which a coil spring 41 is wound, is inserted through the bearing 45. The upper end of the supporting pin 51 is fixed on the frame 101. The upper end of the coil spring 41 is engaged also with the outer frame 101, and the lower end thereof is engaged with the bearing 45. The coil spring 41 is wound in the direction shown here. When the sensor supporting arm 40 is pivoted to the position C (shown with the dashed line) from the position B (solid line), the bearing 45 screws the coil spring 41 in the manner that the coil diameter is reduced.

Therefore, when the sensor supporting arm 40 is moved to the position C, it is energized by the resiliency of the coil spring 41 to retract to the position B. The spring constant, wire diameter, average radius, effective number of turns, etc. of the coil spring 41 are determined at appropriate values with the weight and pivoting area of the sensor supporting arm 40 taken into consideration.

Another applicable mechanism is as follows. When the sensor supporting arm 40 is pivoted to the position C, the coil spring 41 is screwed in the manner that the coil diameter is enlarged. The sensor supporting arm 40 is energized to retract by the resiliency of the coil spring 41. A spiral spring may be used instead of a coil spring.

According to the above method, even if the solenoid 42 has such inconvenience as malfunction or disconnection, the sensor supporting arm 40 is surely be retracted to the position B.

The solenoid 42 and the sensor supporting arm 40 are connected with each other through a pivotal lever 44 and a substantially L-shaped crank lever 43. The crank lever 43 is rotatable around a horizontal axis (not shown). One end 43a of the crank lever 43 is engaged with a rod 42a of the solenoid 42. The other end 43b of the crank lever 43 is inserted into an elliptic hole 44b of the pivotal lever 44, which is connected with the pivoting center 40a of the sensor supporting arm 40.

When the solenoid 42 is not electrified, the crank lever 43 stands vertically as shown with the solid line in FIG. 3, and the sensor supporting arm 40 is energized to be back at the position B. When the solenoid 42 is electrified, the rod 42a is lowered, and so the crank lever 43 is rotated in the direction of an arrow c. Accordingly, the pivoting center 40a connected with the pivotal lever 44 is moved in the same direction. By this operation, the sensor supporting arm 40 is moved to the position C against the resiliency of the coil spring 41. At this time, the end of the sensor supporting arm 40 which is closer to the pivoting center 40a is in contact with a stopper 50 (FIG. 2), whereby the sensor supporting arm 40 is prevented from being further pivoting. In this embodiment, the pivoting angle in this state is 30°.

Figure 5A:
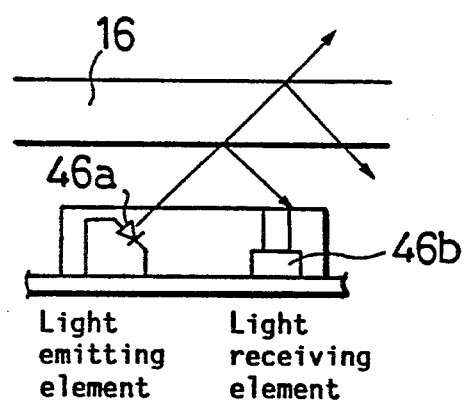
FIGS. 5a and 5b explains a principle on how each document condition detecting sensor detects light.
Figure 5B:
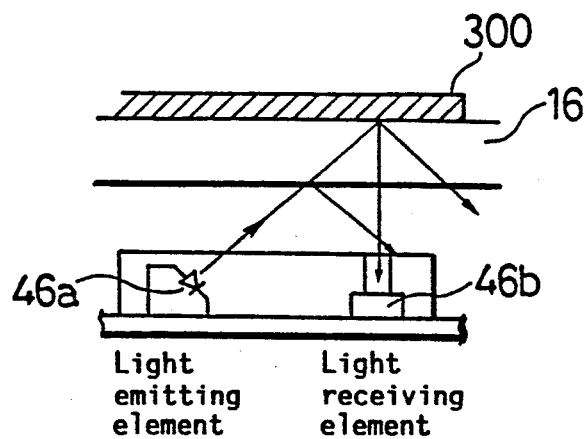

Now, how the document size is detected will be described, referring to FIG. 2. As mentioned before, the sensor supporting arm 40 has multiple sensors (four in this embodiment) 46, 47, 48 and 49 arranged in its longitudinal direction with a predetermined interval. As exemplified in FIGS. 5a and 5b, the sensor 46 comprises a light emitting element 46a for emitting light obliquely upward and a light receiving element 46b whose light receiving surface is directed right above.

When no document is placed on the glass document table 16 (FIG. 5a), the light from the light emitting element 46a transmits through the glass document table 16. Therefore, the light receiving element 46b receives no light, and so the sensor 46 sends a high level of output (referred to as "H" hereinafter).

When a document 300 is placed on the glass document table 16 (FIG. 5b), the light from the light emitting element 46a is radiated upon the document 300 right above the light receiving element 46b, irregularly reflected and received by the light receiving element 46b. Therefore, the light receiving element 46b sends a low level of output (referred to as "L" hereinafter).

Figure 6:
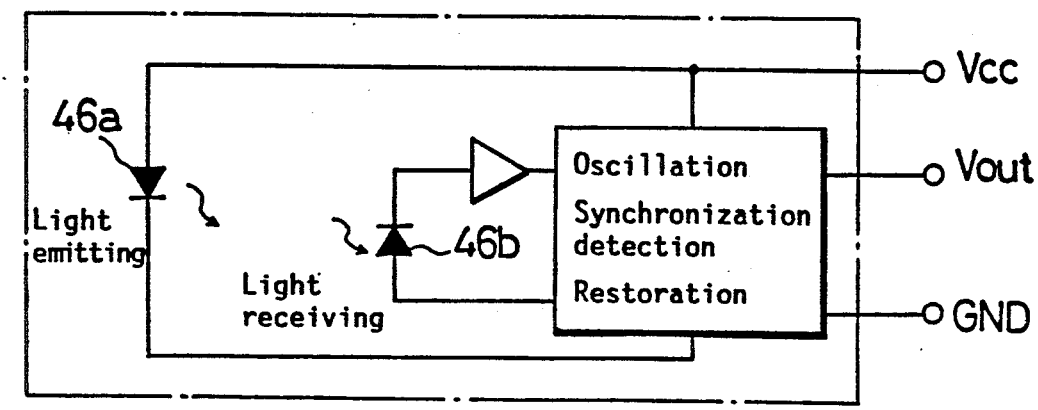
FIG. 6 shows an electric circuit of the sensor.

The sensors 47, 48 and 49 respectively comprises light emitting elements 47a, 48a and 49a and light receiving elements 47b, 48b and 49b . These sensors are operated in the same way as the sensor 46. As shown in FIG. 6, both the light emitting and light receiving elements of the sensors 46, 47, 48 and 49 are synchronized with each other by a synchronizing circuit 50, whereby the light receiving element 46b receives only the light from the light emitting element 46a, 47b receives only the light from 47a, 48b receives only the light from 48a, and 49b receives only the light from 49a.

When the sensor supporting arm 40 is at the position C of FIG. 2, the document size is detected by the combination of the outputs from the sensors 46, 47, 48 and 49.

When an A5-sized document is placed on the glass document table 16, on area A5T, none of the sensors 46 through 49 is below the document. Therefore, the sensors output "H" (Table 1, (1)).

When a B5-sized document is placed on area B5T, only the sensor 48 is below the document, whereby the sensor 48 outputs "L" and the other sensors output "H". (Table 1, (3))

When an A4-sized document is placed on area A4T, the sensors 48 and 49 are below the document, whereby these two sensors output "L" and the other two "H". (Table 1, (4))

When a B4-sized document is placed on area B4T, the sensors 47, 48 and 49 are below the document and output "L" while 46 "H" (Table 1, (8)).

When an A3-sized document is placed on area A3T, all the four sensors are below the document and output "L" (Table 1, (16)).

When a B5-sized document is placed on area B5Y, only the sensor 47 is below the document and outputs "L" while the others "H" (Table 1, (5)).

When an A4-sized document is placed on area A4Y, the sensors 46 and 47 are below the document and output "L" while the others "H" (Table 1, (13)).

(2), (6), (7), (9) through (12), (14) and (15) do not occur for document size detection.

Even when the sensor supporting arm 40 is retracted at the position B, that can also be detected by the combination of the outputs from the sensors 46 through 49. As shown in FIG. 4, a frame 102, which fixes the glass document table 16, has openings 102a and 102b at the positions opposing the sensors 47 and 49. Therefore, the lights from the light emitting elements 47a and 49a are radiated upon the rear surface of a projecting plate 101a of the frame 101, irregularly reflected and respectively received by the light receiving elements 47b and 49b.

The lights from 46a and 48a are also radiated upon the rear surface of the frame 102, but are not received by 46b and 48b because the distance between the 46a/48a and the frame 102 is small. Therefore, when the sensor supporting arm 40 is retracted, 47 and 49 output "L" and 46 and 48 "H" (Table 1, ((6))

When an irregular sized document, for example, a square one whose side is as long as the longer side of a B5-sized document is placed on the glass document table 16, the sensors 47 and 48 are below the document and output "L" while the other two "H". (Table 1, (7)) If the above frame 102 has openings at the positions opposing the sensors 47 and 48, it cannot be detected whether the above irregular sized document is placed or the sensor supporting arm 40 is at the position B.

According to this invention, a combination which does not occur even if an irregular sized document is placed on the glass document table 16 is used for detecting the position of the sensor supporting arm 40.

TABLE 1

| | Sensor 46 | Sensor 47 | Sensor 48 | Sensor 49 | Document size to detect |
|---|---|---|---|---|---|
| (1) | H | H | H | H | A5T |
| (2) | H | H | H | L | |
| (3) | H | H | L | H | B5T |
| (4) | H | H | L | L | A4T |
| (5) | H | L | H | H | B5Y |
| (6) | H | L | H | L | |
| (7) | H | L | L | H | |
| (8) | H | L | L | L | B4 |
| (9) | L | H | H | H | |
| (10) | L | H | H | L | |
| (11) | L | H | L | H | |
| (12) | L | H | L | L | |
| (13) | L | L | H | H | A4Y |
| (14) | L | L | H | L | |
| (15) | L | L | L | H | |
| (16) | L | L | L | L | A3 |

It is apparent from Table 1 that the size and direction of the document is detected by the combination of the outputs from the sensors.

Moreover, one of the combinations which are not used for document size detection ((6) in this embodiment) indicates that the sensor supporting arm 40 is retracted.

Construction of the cover 205 and its vicinity

Figure 7:
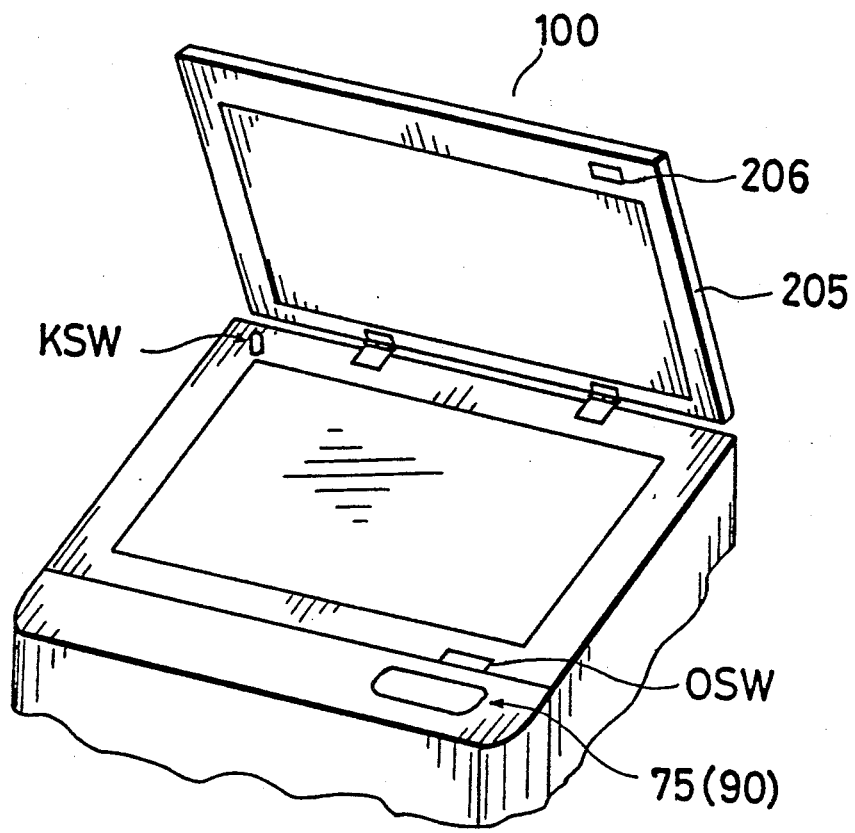
FIG. 7 shows a document holding cover and its vicinity.
Figure 8:
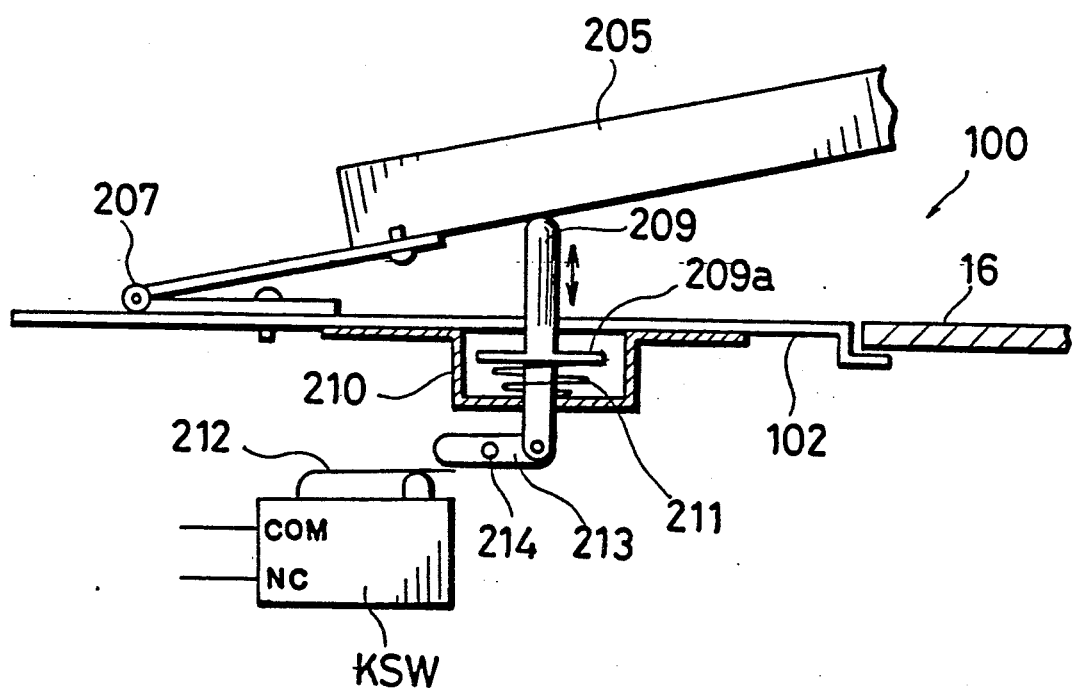
FIG. 8 is a vertical cross section of a mechanism for detecting whether the above cover is opened more than a predetermined angle or not.

FIG. 7 shows the cover 205 and its vicinity in a simplified form when the cover 205 is opened, and FIG. 8 is a cross sectional view of the cover 205 and its vicinity. As shown in FIG. 7, the copier 100 has a lead switch OSW for detecting whether the cover 205 is opened or closed. It is provided on the upper surface of the copier 100, on the lower right corner in this figure. A magnet 206 is provided on the rear surface of the cover 205 in the manner that the magnet 206 is in contact with the switch OSW when the cover 205 is closed. When the cover 205 is closed, the switch OSW senses a magnet 206 and is turned on, thereby indicating the cover 205 is closed. When the cover 205 is opened, the switch OSW is turned off, indicating the cover 205 is opened.

When the switch OSW is turned on, the copier 100 is put into the ADF mode by a CPU 70.

As shown in FIG. 7, the cover 205 is rotatably supported by a pair of hinges 207. Off to the lower right of one of the hinges 207 in FIG. 8 is the switch KSW for detecting whether the cover 205 is opened less than a predetermined angle (30 in this embodiment) or not.

The frame 102 has a push rod 209, which is contacted with the rear surface of the cover 205. The push rod 209 is movable vertically and pushes up the cover 205 by the force of a spring 211 until the cover 205 is opened 30°. The spring 211 is provided between an engaging member 209a at the middle of the push rod 209 and a bracket 210 attached on the bottom surface of the frame 102. The opening angle is set 30°, with ease of usage taken into consideration.

When the cover 205 is pushed downward, the push rod 209 is pushed down against the force of the spring 211. Then, the right end (FIG. 8) of a pushing lever 213 is lowered, and so the other end of the pushing lever 213 is separated from a sensing lever 212, whereby the switch KSW is turned off. When the cover 205 is completely closed, locking means (not shown) is operated to lock the cover 205 against the force of the spring 211.

When the cover 205 is opened a little after that, the push rod 209 is pushed up by the force of the spring 211 until the cover 205 is opened 30°. When the cover 205 is opened 30°, the pushing lever 213 is directed in the opposite way from the above (or is almost horizontal). The left end (FIG. 8) of the pushing lever 213 is contacted with the sensing lever 212, whereby the switch KSW is turned on.

Thus, the switch KSW is turned on when the cover 205 is opened 30° or more, and is turned off when the cover 205 is opened less than 30°. The detection results of the switch KSW, as well as of the switch OSW are input into the CPU 70.

Construction and operation of control circuit

Figure 9:
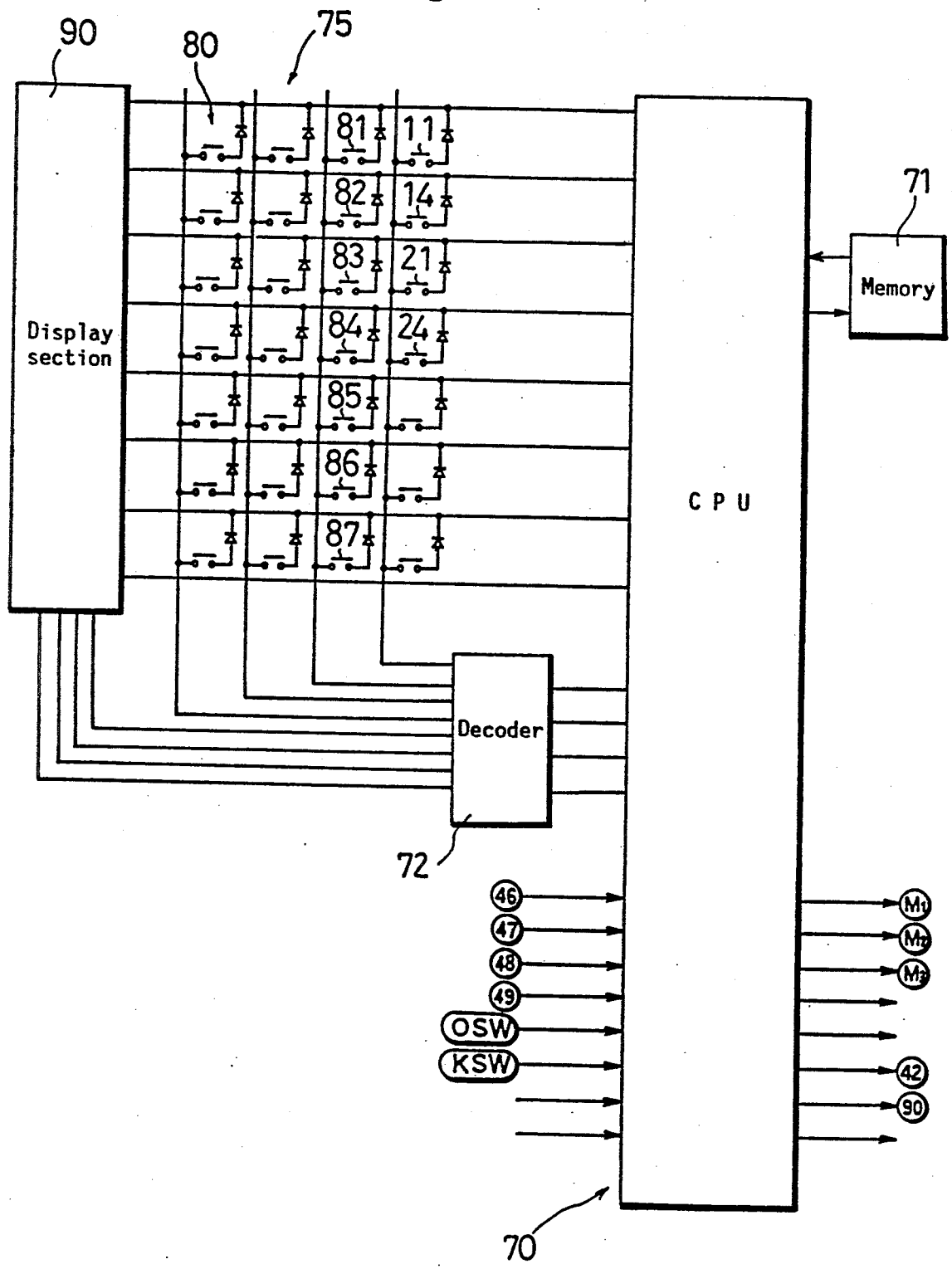
FIG. 9 is a block diagram showing a control circuit of the copier 100.
Figure 10:
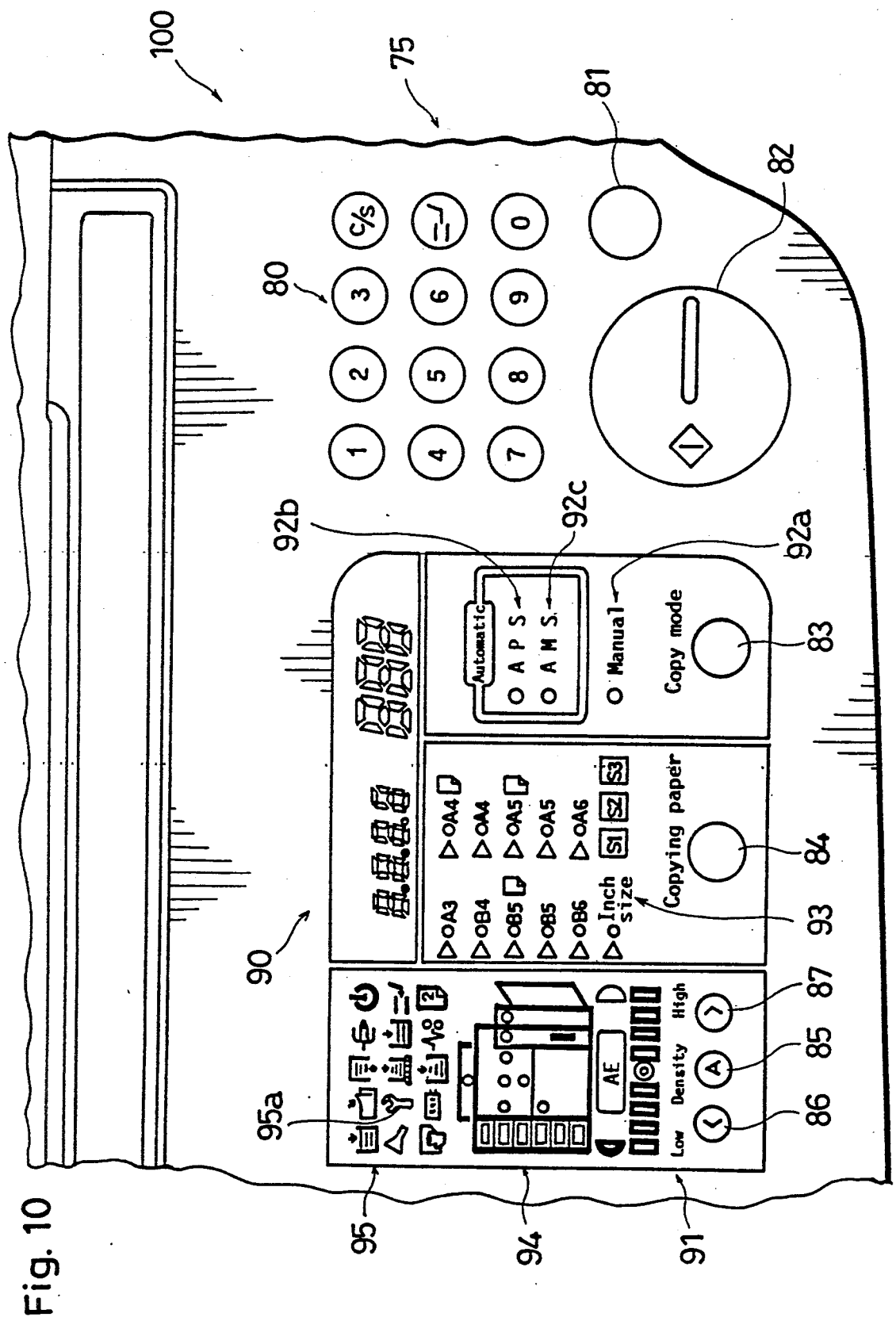
FIG. 10 shows an operation panel and a display section provided on the top of the copier 100.

FIG. 9 is a block diagram of a control circuit of the copier 100, and FIG. 10 shows a control panel 75 and its display section 90 provided on the upper surface of the copier 100, on the lower right in FIG. 7.

The CPU 70 is a core for controlling the copier 100. It receives, through an input port, detection signals sent from various switches and other signals which is input by pushing keys of the operation panel 75, and sends out signals for controlling the whole operation of the copier 100 through an output port.

Practically, the detection signals are ON/OFF signals sent from the switches 11 through 14 and 21 through 24, the signals from the switch OSW which indicates whether the cover 205 is opened or closed, the signals from the switch KSW which indicates whether the cover 205 is opened less than 30° or not, and the detection signals sent from the sensors 46 through 49.

The key input signals are ON signals sent from ten keys 80, an all reset key 81, a print key 82, a copy mode selecting key 83, a copying paper selecting key 84, an exposure system selecting key 85 for selecting automatic exposure or manual exposure, a manual exposure operating key 86 for commanding high density and another manual exposure operating key 87 for commanding low density.

The signals sent from the CPU 70 include driving signals for a main motor M1 and the other motors M2, M3, etc., electrification controlling signals for the solenoid 42, and display signals for the display section 90. Furthermore, the CPU 70 is connected with a memory 71 for storing such data as document size.

The display section 90 comprises a plurality of LEDs arranged in matrix and is provided to the left of the ten keys 80. The display section 90 includes exposure level displaying LEDs 91, an automatic paper selection (APS) mode displaying LED 92b, an automatic magnification ratio selection (AMS) mode displaying LED 92c, a manual mode displaying LED 92a, LEDs 93 for displaying paper size, etc., paper feeding opening displaying LEDs 94, and message displaying LEDs 95. Which LED (LEDs) is (are) lighted up is determined in accordance with the computing results of a decoder 72, connected with the display section 90 and the CPU 70. When the copy mode selecting key 83 is pushed, the APS mode displaying LED 92b, the AMS mode displaying LED 92c or the manual mode displaying LED 92a is lighted up.

Figure 11:
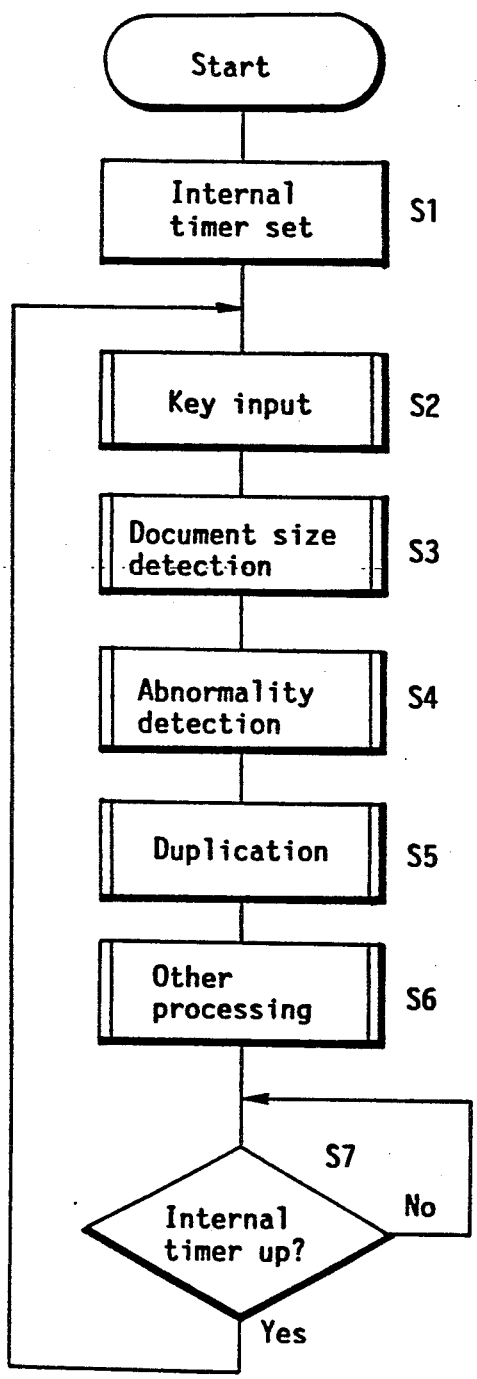
FIG. 11 shows a main routine of the copier 100.

FIG. 11 shows the main routine of the copying operation controlled by the above controlling circuit. When the copier 100 is initialized, an internal timer is set (S1). The internal timer controls the routine of copying operation round by round, and the operation of each step is measured based on this internal timer. When the internal timer is set, key-input signals from the operation panel 75 are read if there are some (S2), the size of a document on the glass document table 16 is detected (S3), abnormality is detected (S4), a duplication operation is executed (S5), and the other operations such as error display is executed (S6). When the period of time set in the internal timer passes (S7), the operations of S2 through S6 are repeated.

Figure 12:
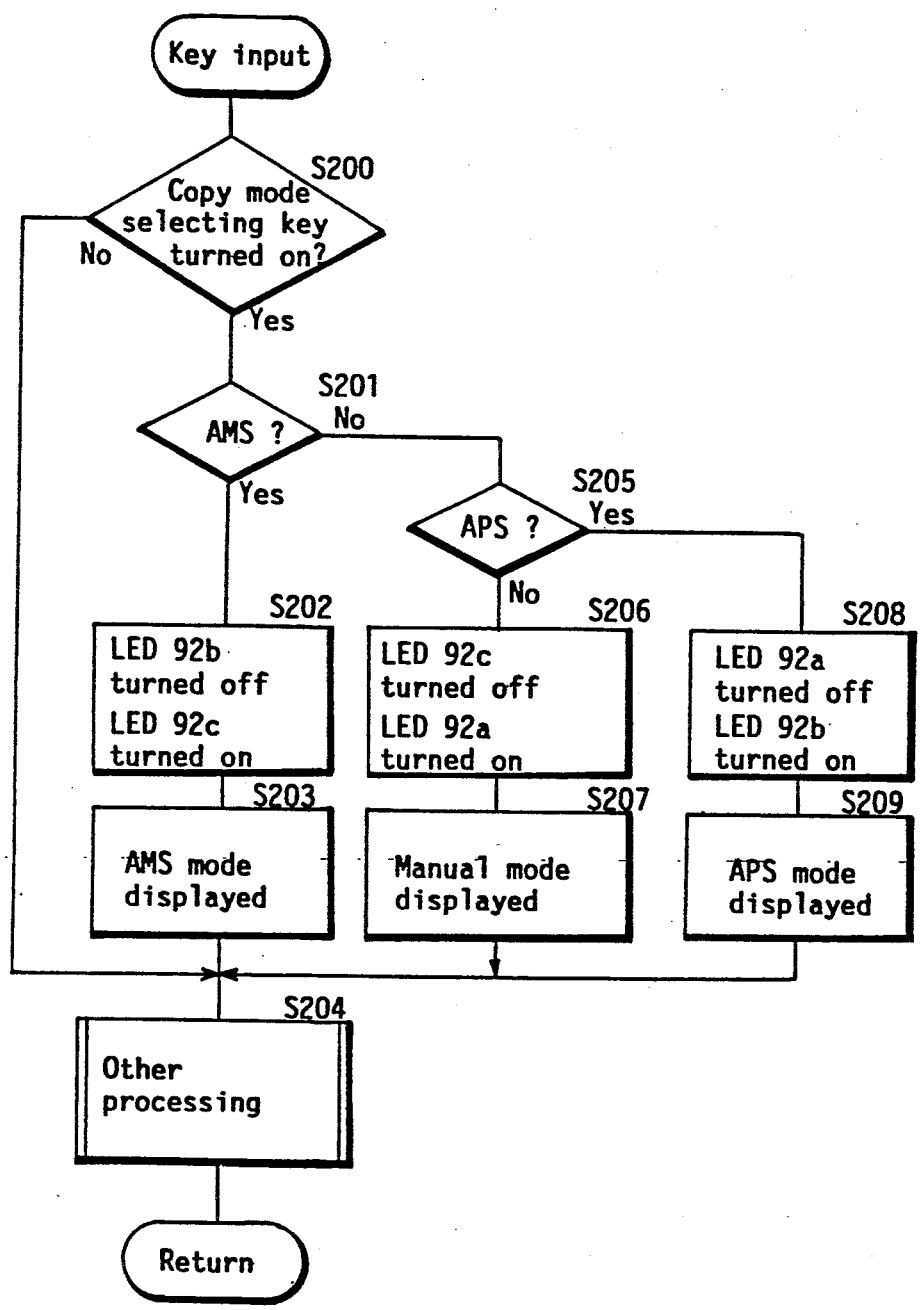
FIG. 12 shows a routine of key input.

FIG. 12 details the routine of key input of S2. Whether the copy mode selecting key 83 is turned on or not is judged (S200). If so, whether the AMS mode is selected or not is judged (S201). If so, the APS mode displaying LED 92b is turned off and the AMS mode displaying LED 92c is turned on (S202), whereby the AMS mode is displayed (S203). The other key input operations such as correcting the number of copies are executed (S204), and then the program goes back to the main routine.

If the AMS mode is not selected in S201, whether the APS mode is selected or not is judged (S205). If not, the AMS mode displaying LED 92c is turned off, and the manual mode displaying LED 92a is turned on (S206), whereby the manual mode is displayed (S207). The program goes to S204 and then back to the main routine.

If the APS mode is selected in S205, the manual mode displaying LED 92a is turned off and the APS mode displaying LED 92b is turned on (S208), whereby the APS mode is displayed (S209). The program goes to S204 and then back to the main routine.

Figure 13A:
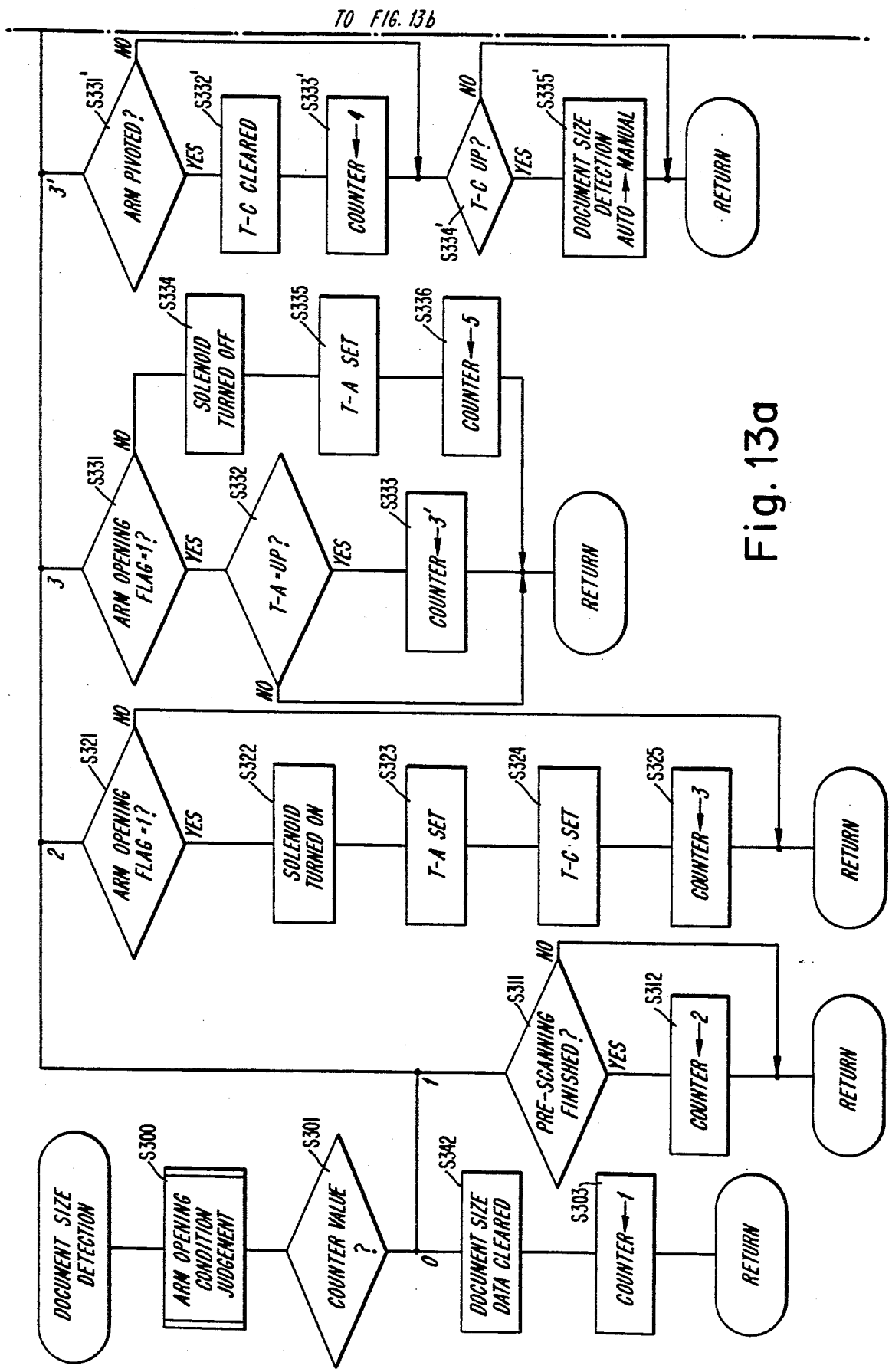
FIGS. 13a and 13b show a routine of document size detection.
Figure 13B:
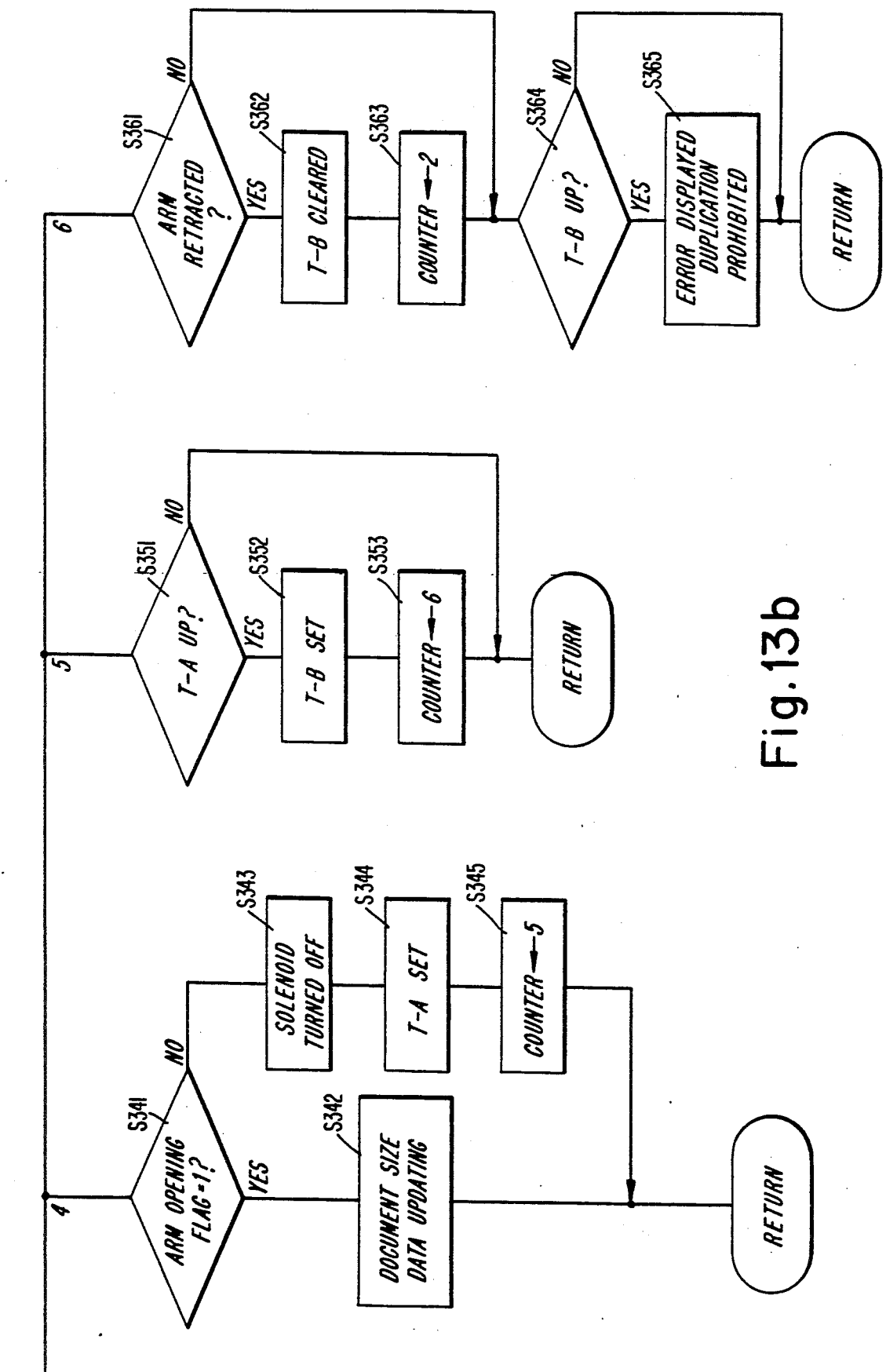

FIGS. 13a and 13b detail the routine of document size detection of S3. This routine is executed either in the ADF or the non-ADF mode. In the ADF mode, the document size is automatically detected by the ADF 200. In the non-ADF mode, the document size is detected by pivoting the sensor supporting arm 40 to a predetermined position (the position C in this embodiment) below the glass document table 16 (referred to as arm opening hereinafter). Whether the copier 100 fulfills the conditions for arm opening or not is judged (S300).

Figure 14:
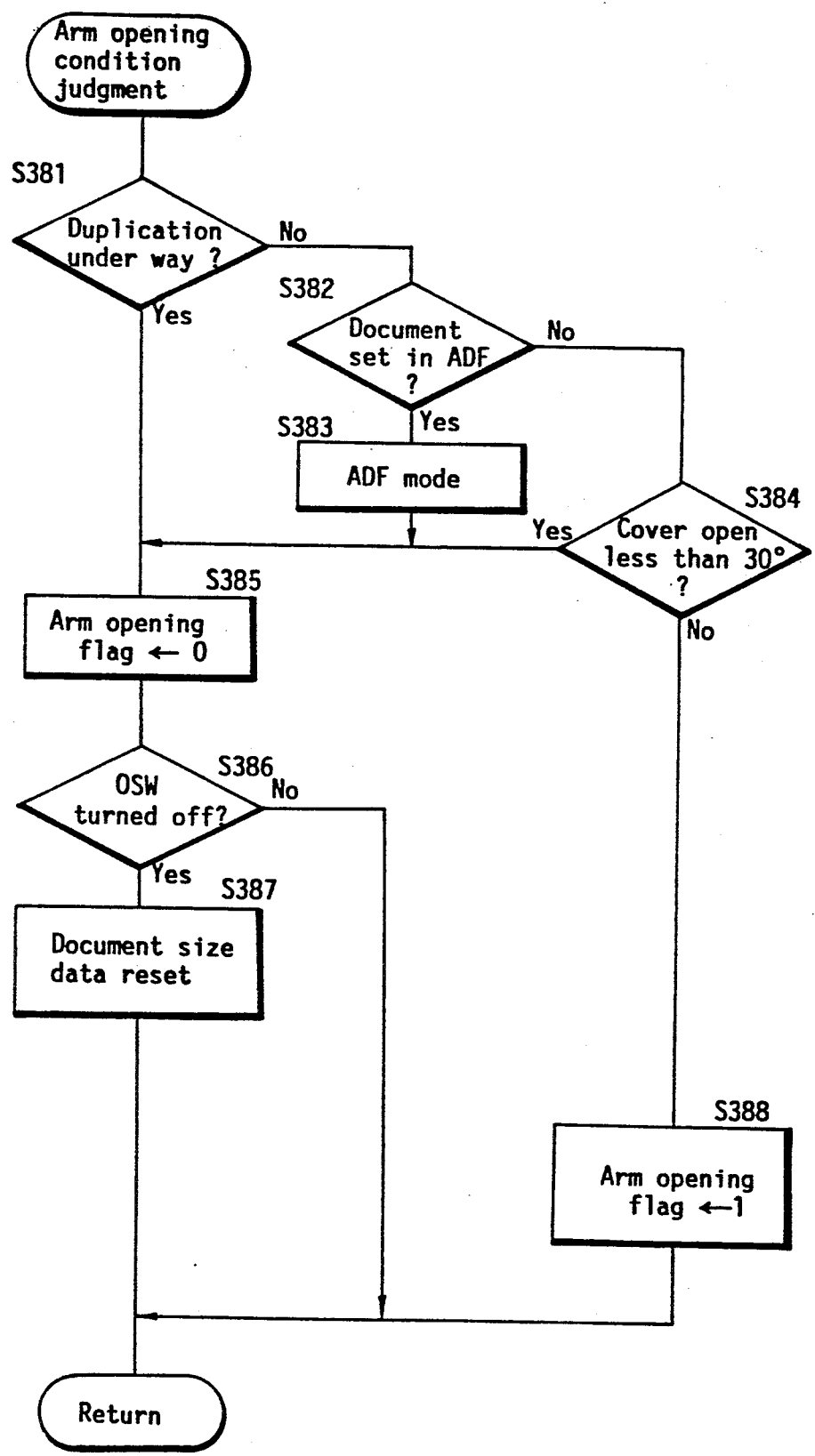
FIG. 14 shows a routine of arm opening condition judgment.

The judgment of S300 is detailed in FIG. 14.

If a document is being duplicated in S381, if a document is set in the ADF 200 in S382 (namely, if the copier 100 is in the ADF mode in S383), or if the cover 205 is opened less than 30° in S384, the arm opening flag is set 0 (S385), whereby arm opening is prohibited.

If no document is being duplicated in S381, if no document is set in the ADF 200 in S382, (namely, if the copier 100 is in the non-ADF mode in S383), or if the cover 205 is opened 30° or more in S384, the copier 100 is judged to fulfill the conditions for arm opening and the arm opening flag is set 1 (S388).

After the arm opening flag is set 0 in S385, whether the switch OSW is turned off or not (namely, whether the cover 205 is opened even a little or completely closed) is judged (S386). If so, the document size which was detected in the previous detection and has been stored in the memory 71 is reset (S387), and the program goes to the main routine.

Judgment of the ON/OFF state of the switch OSW prevents duplication errors. Some operators may open the cover 205 less than 30° to manually set a new document on the glass document table 16. If the switch OSW is not provided, the CPU 70 will not be informed that the new document is set. Since the switch KSW is on in this state, the CPU 70 judges that the copier 100 is in the duplication operation. Although the actual document size is changed, the stored document size and the stored magnification ratio are not changed, whereby a duplication error occurs. According to this invention, however, the judgment of the ON/OFF state of the switch OSW solves the above problem. Therefore, the CPU 70 is informed that a new document is set, and such an error is avoided.

After the arm opening condition judgment, the value of a state counter is measured (S301) (FIGS. 13a and 13b). The above value can be 1, 2, 3, 3', 4, 5 or 6, and is incremented each time the program finishes the operation of each state as will be described below. When the copier 100 is initialized, the counter indicates 0. The program executes the operation of state 0 and goes back to the main routine. When the program advances to S301 again, the value of the counter is measured. The program jumps to the state which is indicated by that value. Thereafter, the similar operation is repeated as will be detailed hereinafter.

When the counter indicates 0 in S301, the data at the initialization (when the copier 100 is restored after a trouble is solved, when the power is turned on, etc.) or the data in the previous detection are cleared (S302). The counter is set 1 (S303) and the program goes to the main routine.

When the counter indicates 1 in S301, whether pre-scanning is finished or not is judged (S311), and if so, the counter is set 2 (S312). If not, the program goes to the main routine without changing the value of the counter and repeats the operation of state 1 until pre-scanning is finished. Thereafter, the counter is set 2 (S312). Pre-scanning is done when the power is turned off or when the copier 100 is restored from such a trouble as jamming, for the purpose of confirming the optical system 10 is normal.

When the counter indicates 2 in S301, whether the arm opening flag is 1 or not is judged (S321). If so, the solenoid 42 is turned on (S322), whereby pivoting the sensor supporting arm 40 to the position C (FIG. 2). The period of time from the sensor supporting arm 40 starts pivoting until it reaches the position C is set by a timer T-A (S323). The time which is longer than twice of that of T-A is set by another timer T-C (S324), and the counter is set 3 (S325). If the arm opening flag is 0 in S321, the program directly goes to the main routine and then repeats the operation of state 2 until the arm opening flag is turned 1.

When the counter indicates 3 in S301, whether the arm opening flag is 1 or not is judged (S331). If so, whether the time of T-A is up or not is judged (S332). If the time is up, the counter is set 3' (S333). If the time is not up yet, the program directly goes to the main routine.

If the arm opening flag is 0 in S331, it means either that the copier 100 is in the duplication operation, that a document is set in the ADF 200, or that the cover 205 is opened less than 30°. In such a case, the solenoid 42 is turned off (S334), whereby the sensor supporting arm 40 starts retracting. The period of time from the sensor supporting arm 40 starts retracting until it is retracted to the position B is set by the timer T-A (S335), and the counter is set 5 (S336).

When the counter indicates 3' in S301, whether the sensor supporting arm 40 has been pivoted or not is judged by the combination of the outputs from the sensors 46 through 49 which is obtained immediately after the sensor supporting arm 40 is retracted to the position B (S331'). If the combination is changed within the time of T-C (if the sensor supporting arm 40 has been pivoted), the time of T-C is cleared (S332'), the counter is set 4 (S333'), and whether the time of T-C is up or not is judged (S334').

If the combination is not changed (if the sensor supporting arm 40 has not been pivoted), in S331', the program directly goes to S334'.

If the time of T-C is up in S334', the document size detection is changed from the automatic mode into the manual mode by operating the copy mode selecting key 83 (S335'), thereafter the program goes to the main routine. If the time of T-C is not up in S334', the program directly goes to the main routine.

If the sensor supporting arm 40 is not normally operated due to the malfunction, wire disconnection, etc. of the solenoid 42 so as to unable automatic document size detection, the automatic mode is automatically switched to the manual mode. After that, the copying operation can be done manually until the copier 100 is repaired by a service personnel. Even if the automatic mode is selected by the operator, the CPU 70 commands the manual mode to inform the operator that automatic document size detection is impossible due to the abnormal pivoting of the sensor supporting arm 40. The following is also applicable. Both automatic and manual operations are prohibited and a "call service personnel" LED 95a (FIG. 10) is lighted up or a warning "document size cannot be detected" is displayed in an additional display window (not shown), in order to inform the operator of the malfunction of the sensor supporting arm 40. In the manual mode, the operator selects the appropriate size of paper.

When the counter indicates 4 in S301, whether the arm opening flag is 1 or not is judged (S341). If so, the outputs from the sensors 46 through 49 are read, in accordance with which the document size is detected in order to update the document size data stored in the memory 71 (S342).

Figure 15:
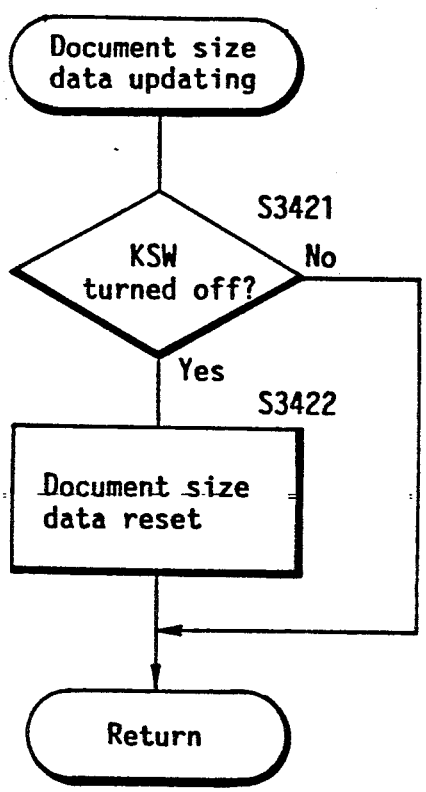
FIG. 15 shows a routine of document size data updating.

FIG. 15 details the routine of updating the document size data. Whether the switch KSW is turned off or not (whether the cover 205 is opened less than 30° or not) is judged (S3421). If the cover 205 is opened 30° or more, the outputs from the sensors 46 through 49 are read, the document size is detected based on the combination of these outputs, and the document size data is updated (S3422). If the cover 205 is opened less than 30°, the program directly goes to the main routine.

If the arm opening flag is 0 in S341, the solenoid 42 is turned off to retract the sensor supporting arm 40 (S343), and the period of time from the sensor supporting arm 40 starts retracting until it is retracted to the position B is set by the timer T-A (S344). The counter is set 5 (S345), and the program goes to the main routine.

When the counter indicates 5 in S301, whether the time of T-A is up or not is judged (S351). If so, the time required for detecting abnormality is set by still another timer T-B (S352), and the counter is set 6 (S353). The time of T-B must be long enough for the sensor supporting arm 40 to be retracted to the position B.

When the counter indicates 6 in S301, whether the sensor supporting arm 40 has been retracted to the position B or not is judged by the outputs from the sensors 46 through 49 (S361). If the sensor supporting arm 40 has not been retracted to the position B in S361, whether the time of T-B is up or not is judged (S364). If the time of T-B is up before the sensor supporting arm 40 reaches the position B, an error is displayed in the display section 90, and the duplication operation is prohibited (S365).

If the sensor supporting arm 40 has been retracted to the position B within the time of T-B in S361, the time of T-B is cleared (S362), the counter is set 2 (S363), and the program goes to S364 and then S365. Each time a new document is set, the program starts from state 2.

Figure 16:
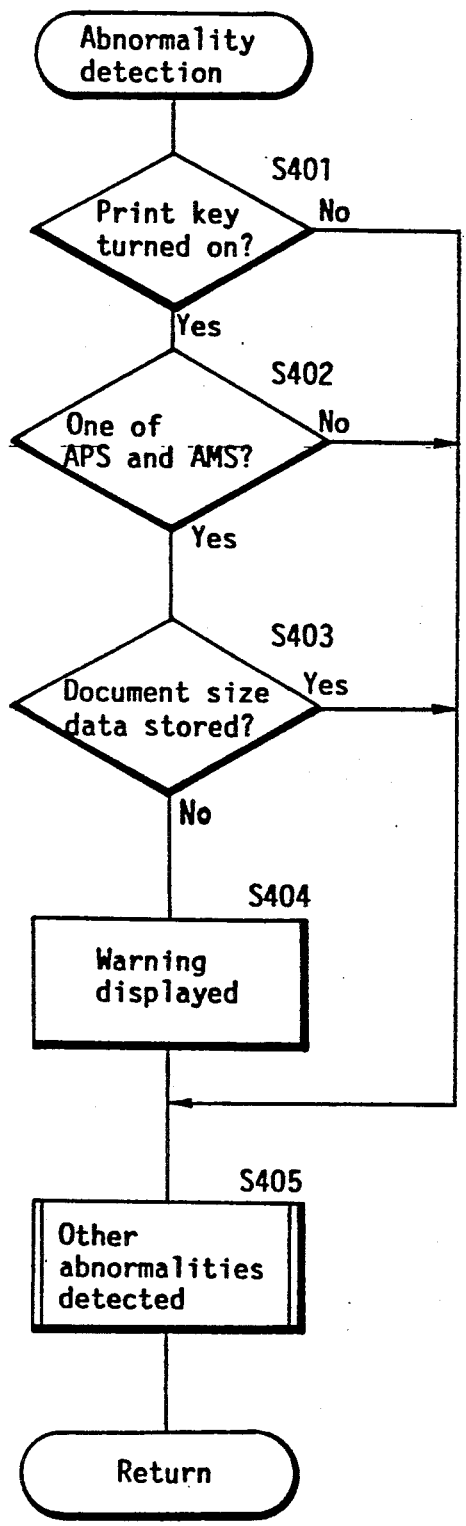
FIG. 16 shows a routine of abnormality detection.

FIG. 16 details the routine of abnormality detection which is done when a new document is set, etc. Whether the print key 82 is turned on or not is judged (S401), and if so, whether the copier 100 is in one of the APS mode and the AMS mode or not is judged (S402).

If the copier 100 is one of the APS mode and the AMS mode, whether the memory 71 stores the document size data or not is judged (S403).

If the memory 71 does not store the document size data in S403, (if a new document is set and the previous data stored in the memory 71 is reset), the duplication cannot be executed in the APS or AMS mode. In such a case, the CPU 70 lights up the "call service personnel" LED 95a (FIG. 10) or displays a warning "APS or AMS mode cannot be used" in the additional display window (not shown) (S404). Thereafter, other abnormalities such as jamming are detected (S405), and the program goes to the main routine.

Figure 17:
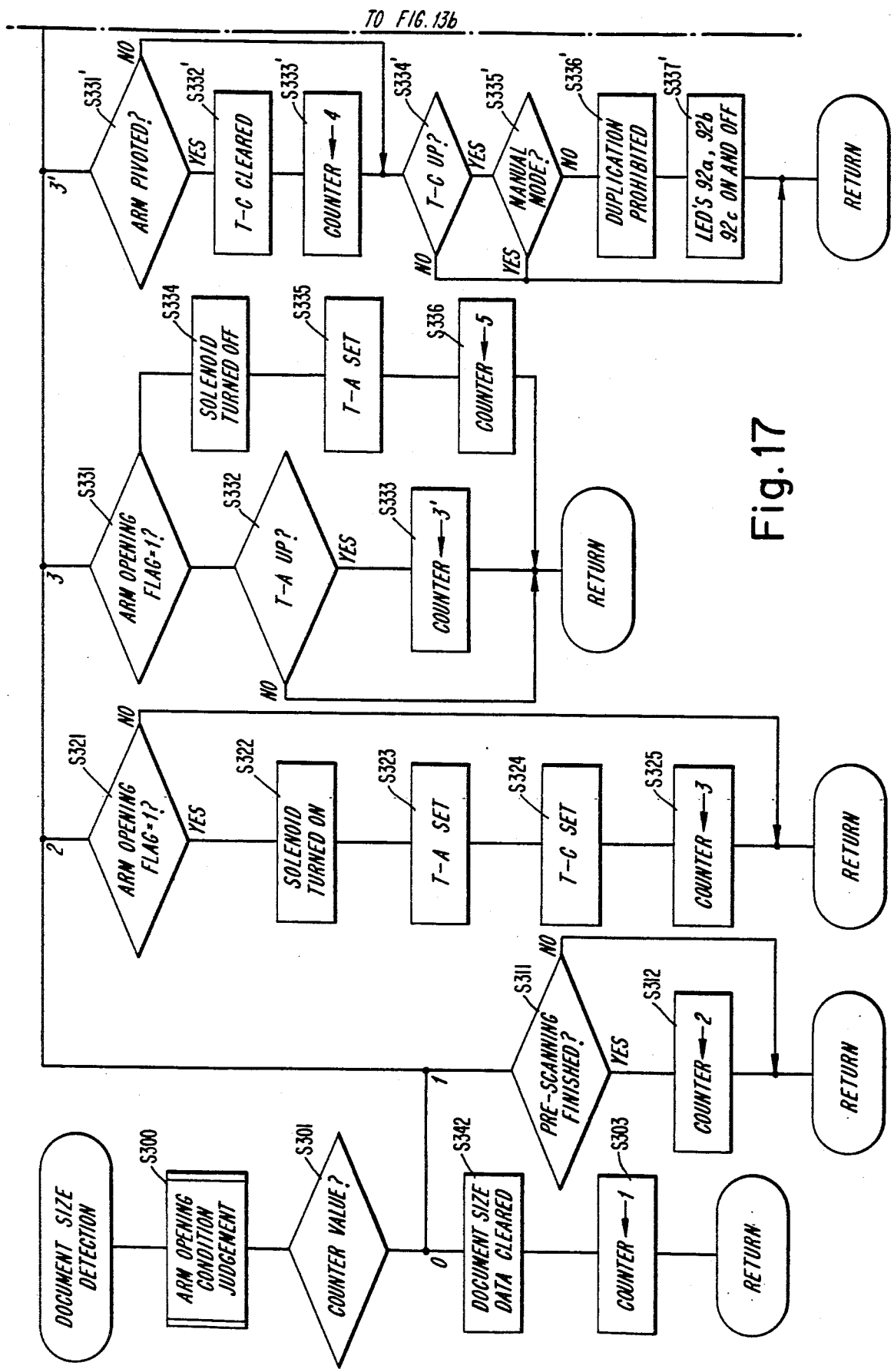
FIG. 17 shows a modification of the routine of document size detection.

FIG. 17 shows a modification of state 3' of FIG. 13a. When the sensor supporting arm 40 is not pivoted to the position C (FIG. 2) despite that the copier 100 is in the automatic document size detection mode and the non-ADF mode, all the operations of the copier 100 is prohibited and restarted only after the operator selects the manual mode. The details will follow.

Whether the sensor supporting arm 40 has been pivoted or not is judged by the combination of the outputs from the sensors 46 through 49 (S331'). If the combination is changed (if the sensor supporting arm 40 has been pivoted and retracted) within the time of T-C, the time of T-C is cleared (S332'), the counter is set 4 (S333'), and whether the time of T-C is up or not is judged (S334').

If the sensor supporting arm 40 has not been pivoted and retracted within the time of T-C in S331', the program directly goes to S334'.

If the time of T-C is not up in S334', the program directly goes to the main routine. If the time of T-C is up in S334', whether the manual operation mode is selected or not is judged (S335'). If not, the duplication operation is prohibited (S336'), and the LEDs 92a, 92b and 92c are illuminated on and off to inform the operator of this situation (S337'). If the manual mode is selected in S335', the program directly goes to the main routine.

Figure 18:
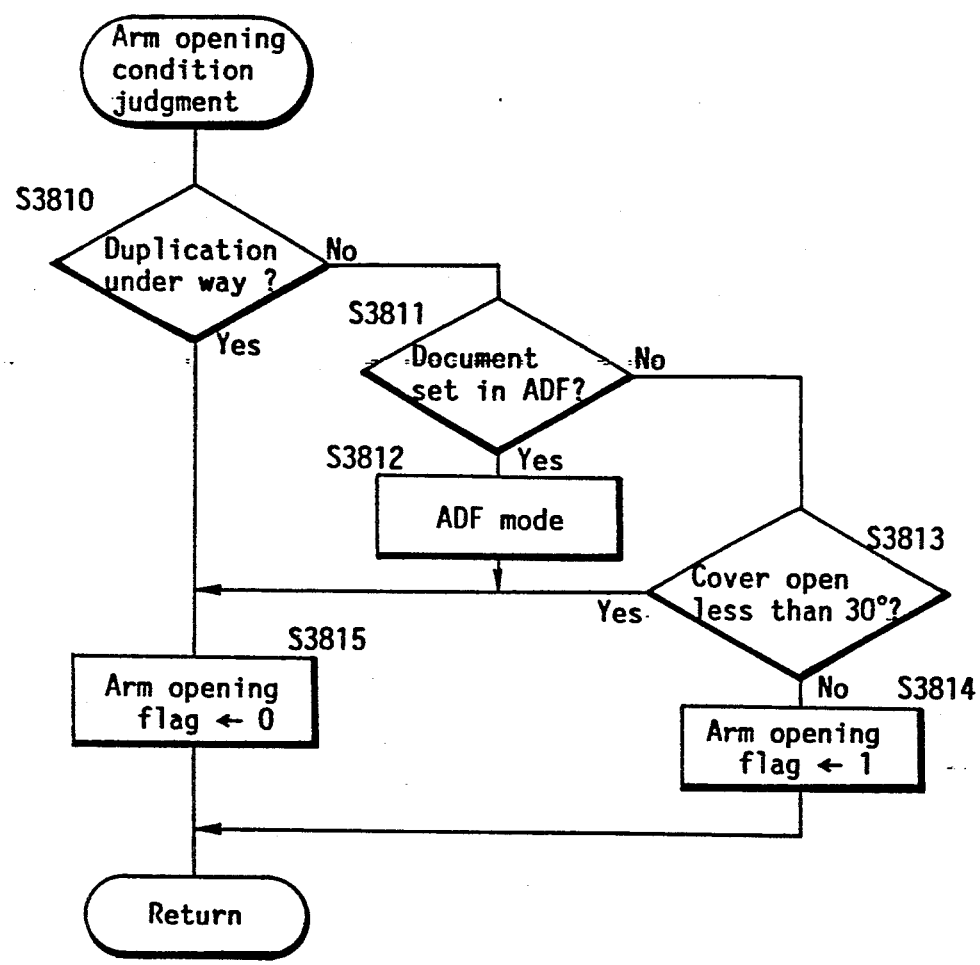
FIG. 18 shows a modification of the routine of arm opening condition judgment.

FIG. 18 shows a modification of the arm opening condition judgment of FIG. 14.

If the copier 100 is in the copying operation in S3810, if a document is set in the ADF 200 in S3811 (namely, if the copier 100 is in the ADF mode in S3812), or if the cover 205 is opened less than 30° in S3813, the arm opening flag is set 0 (S3815), whereby arm opening is prohibited.

If the copier 100 is not in the copying operation in S3810, if no document is set in the ADF 200 in S3811 (namely, if the copier 100 is not in the ADF mode) in S3812, or if the cover 205 is opened 30° or more in S3813, the arm opening flag is set 1, whereby the copier 100 is judged to fulfill the conditions for arm opening. After S3815 or S3814, the program goes to the main routine.

In the above embodiment, the sensors 46 through 49 are for detecting the document size. However, a sensor for detecting the density of the document image may also be used. One sensor is enough in that case.

This invention is employed in a copier equipped with an ADF in the above embodiment. Needless to say, however, it may also be employed in a copier without an ADF.

The optical system is not limited to the one in this embodiment, but may comprise a CCD.

Although the present invention has been fully described by way of an embodiment with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A document detecting device for an image forming apparatus comprising:
   a glass document table on which a document is to be placed,
   projecting means for optically scanning the document on said document table from below and for projecting a light corresponding to an image of the document onto a device for electrically retaining the image,
   a plurality of sensors for detecting document condition,
   sensor supporting means, for supporting said sensors, which is pivotal between a predetermined position below said glass document table and its original position outside the area right below said glass document table, and
   pivoting means for pivoting said sensor supporting means, and
   computing means for driving said pivoting means to pivot said sensor supporting means to the predetermined position and for detecting the size of the document dependent upon outputs from said sensors.

2. A document detecting device for an image forming apparatus claimed in claim 1, wherein the device for electrically retaining the image is a photoconductive drum.

3. A document detecting device for an image forming apparatus claimed in claim 1, wherein said sensor detects whether there is a document in its detecting spot or not.

4. A document detecting device for an image forming apparatus claimed in claim 1, wherein said sensor detects the density of the document image in its detecting spot.

5. A document detecting device for an image forming apparatus claimed in claim 1, wherein said sensor comprises a light emitting and a light receiving elements.

6. A document detecting device for an image forming apparatus claimed in claim 5, wherein the light emitting device emits a light obliquely upward, and the light receiving element has its light receiving surface directed right above in order to detect irregularly reflected light.

7. A document detecting device for an image forming apparatus claimed in claim 1, wherein said sensor supporting means is a long straight rod having its only pivoting center near one end thereof.

8. A document detecting device for an image forming apparatus claimed in claim 7, wherein the pivoting center is on the same side with the scan starting position of said projecting means, in view of the scanning direction.

9. A document detecting device for an image forming apparatus claimed in claim 7, wherein the pivoting center is on the same side with a side of said glass document table along which the document is aligned, in the view of the scanning direction.

10. A document detecting device for an image forming apparatus claimed in claim 1, wherein said sensor supporting means is always energized toward its original position and is pivoted to the predetermined position by said pivoting means against the energizing force.

11. A document detecting device for an image forming apparatus comprising:
   a glass document table on which a document is to be placed,
   a document holding cover pivotally provided so that it may be closed to cover said glass document table and opened,
   projecting means for optically scanning the document on said document table from below and for projecting a light corresponding to an image of the document onto a device for electrically retaining the image,
   a plurality of sensors for detecting document condition,
   sensor supporting means, for supporting said sensors, which is pivotal between a predetermined position below said glass document table and its original position outside the area right below said glass document table,
   pivoting means for pivoting said sensor supporting means,
   computing means for driving said pivoting means to pivot said sensor supporting means to the predetermined position and for detecting the size of the document dependent upon outputs from said sensors, and
   control means for retracting said sensor supporting means back to its original position when said document holding cover is closed and for pivoting said sensor supporting means to the predetermined position when said document holding cover is opened.

12. A document detecting device for an image forming apparatus comprising:
   a glass document table on which a document is to be placed,
   a document holding cover pivotally provided so that it may be closed to cover said glass document table and opened,
   angle detecting means for detecting whether said document holding cover is opened less than the predetermined angle or not,
   projecting means for optically scanning the document on said document table from below and for projecting a light corresponding to an image of the document onto a device for electrically retaining the image,
   a plurality of sensors for detecting document condition,
   sensor supporting means, for supporting said sensors, which is pivotal between a predetermined position below said glass document table and its original position outside the area right below said glass document table,
   pivoting means for pivoting said sensor supporting means,
   computing means for driving said pivoting means to pivot said sensor supporting means up to the predetermined position and for detecting the size of the document using an output from said sensors, and
   commanding means for commanding said computing means to detect the document size when said angle detecting means detects that said document holding cover is opened not less than the predetermined angle.

13. A document detecting device for an image forming apparatus claimed in claim 12, wherein the predetermined angle is 30°.

14. A document detecting device for an image forming apparatus claimed in claim 12, further comprising:
   storing means for storing a document size data obtained by said computing means,
   detecting means for detecting whether said document holding cover is opened or closed, and
   resetting means for resetting the document size data stored in said storing means in accordance with the detection result of said detecting means.

15. A document detecting device for an image forming apparatus comprising:
   a glass document table on which a document is to be placed,
   projecting means for optically scanning the document on said document table from below and for projecting a light corresponding to an image of the document onto a device for electrically retaining the image,
   a plurality of sensors for detecting document condition,
   sensor supporting means, for supporting said sensors, which is pivotal between a predetermined position below said glass document table and its original position outside the area right below said glass document table,
   pivoting means for pivoting said sensor supporting means,
   computing means for driving said pivoting means to pivot said sensor supporting means up to the predetermined position and for detecting the size of the document using the combination of outputs from said sensors, and
   judging means for selecting one out of combinations of outputs from said sensors, the above combinations not being used for document size detection, and for judging whether said sensor supporting means is at its original position or not using the above-selected combination.

16. A document detecting device for an image forming apparatus claimed in claim 15, further comprising:
   a member, provided above the original position of said sensor supporting means, for changing the detection result of at least one of said sensors so that the combination of outputs selected by said judging means may be obtained.

17. A document detecting device for an image forming apparatus claimed in claim 15, wherein said computing means also detects whether said sensor supporting means has been pivoted or not using the change with the passage of time in the combination of outputs from said sensors.

18. A document detecting device for an image forming apparatus comprising:
   a glass document table on which a document is to be placed,
   projecting means for optically scanning the document on said document table from below and for projecting a light corresponding to an image of the document onto a device for electrically retaining the image,
   a plurality of sensors for detecting document condition,
   sensor supporting means, for supporting said sensors, which is pivotal between a predetermined position below said glass document table and its original position outside the area right below said glass document table, pivoting means for pivoting said sensor supporting means, automatic mode setting means for pivoting said sensor supporting means up to the predetermined position to set the automatic mode, in which the size of the document is automatically detected by said sensor, manual mode setting means for setting manual mode, in which the size of the document is manually selected, and mode switching means for changing the automatic mode into the manual mode when said sensor supporting means is detected not to have been pivoted to the predetermined position.

19. A document detecting device for an image forming apparatus claimed in claim 18, wherein said mode switching means is operated only when, despite that both the automatic and the ADF modes are selected, said sensor supporting means is detected not to have been pivoted.

20. A document detecting device for an image forming apparatus claimed in claim 18, further comprising:
displaying means for displaying that said supporting means is detected not to have been pivoted.

21. A document detecting device for an image forming apparatus comprising:

a glass document table on which a document is to be placed, projecting means for optically scanning the document on said document table from below and for projecting a light corresponding to an image of the document onto an image forming device, a plurality of sensors for detecting document condition, sensor supporting means, for supporting said sensors, which is pivotal between a predetermined position below said glass document table and its original position outside the area right below said glass document table, pivoting means for pivoting said sensor supporting means, automatic mode setting means for pivoting said sensor supporting means up to the predetermined position to set an automatic mode, in which the size of the document is automatically detected by said sensors, manual mode setting means for setting manual mode, in which the size of the document is manually selected, prohibiting means for prohibiting the image forming operation of the image forming device when said sensor supporting means is detected not to have been pivoted to the predetermined position in the automatic mode, mode switching means for switching the automatic mode into the manual mode when said prohibiting means prohibits the above image forming operation, and releasing means for releasing the prohibition of the above image forming operation when the automatic mode is switched into the manual mode.

* * * * *